United States Patent Office 2,988,450
Patented June 13, 1961

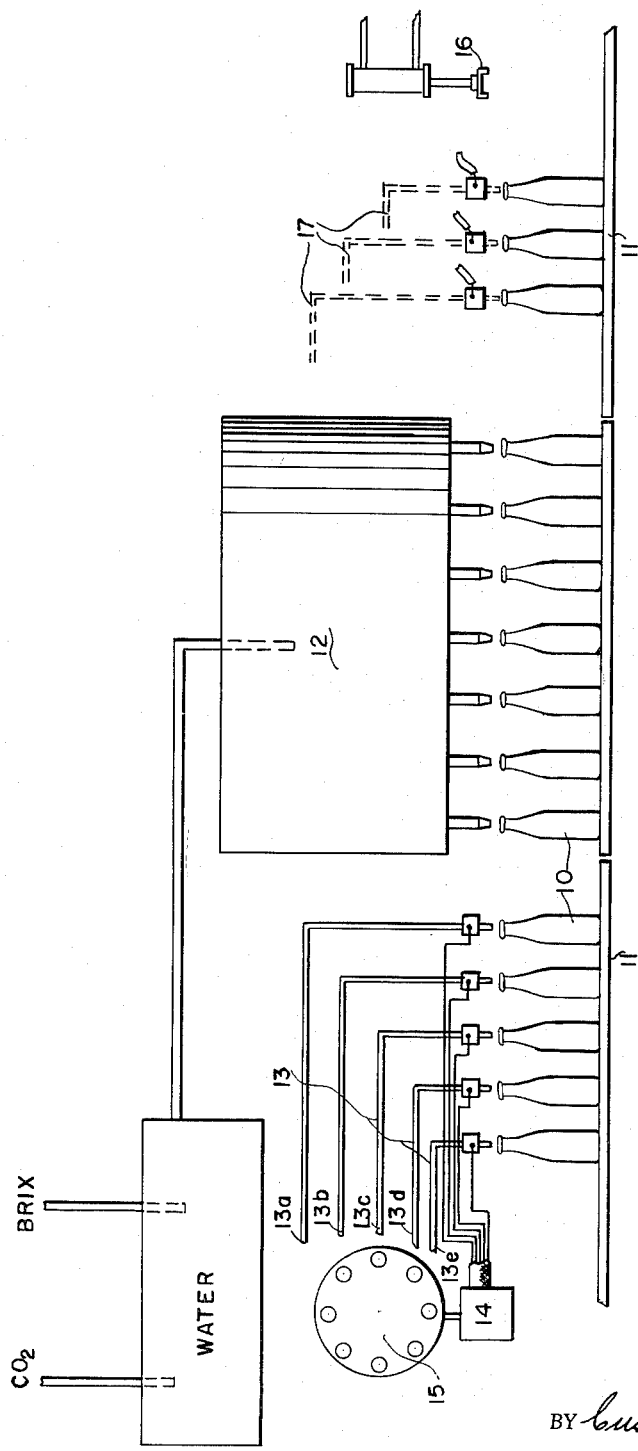

2,988,450
BEVERAGE MANUFACTURE
Iliya F. Bulatkin, Baltimore, Md., assignor to Crown Cork & Seal Company, Inc., Philadelphia, Pa., a corporation of New York
Filed June 25, 1958, Ser. No. 744,521
3 Claims. (Cl. 99—79)

This invention relates to a process of preparing beverages such as soft drinks of various flavors of the carbonated type.

At the present time these beverages are made by preparing in the usual manner the desired well-known mixture of cooled carbonated water, sugar syrup or Brix and flavor, such as kola, lemon, orange, lime, sarsaparilla, ginger, cream, etc., then supplying this complete soft drink composition to a conventional bottle filling machine and thereafter to a capping machine.

In the improved process of this invention the flavor is supplied to the bottles separately and individually and without going through the filler either before the bottles reach the filler or after filling. Therefore, it is possible to provide the customary carbonated basic mixture of water and sugar syrup and at a suitable desired temperature, and there is no need to clean out any of the equipment, particularly the filling apparatus, when changing from one flavor to another. This is important in that it saves time, labor and the equipment, on the one hand, and avoids making drinks having off-flavors, on the other. Moreover, a variety of drinks may be continually made without stopping the equipment. Thus, by having a plurality of sources each supplying a different flavor, it is possible to feed the flavor to a series of moving bottles, e.g., to the first one kola, the second orange, the third lime, etc. Instead of feeding to just one, more than one may be supplied with the same flavor, e.g., a dozen may be fed kola, the next dozen orange, the third dozen lime, etc. In each case, the capping equipment will have a distributor gate to direct those having the same flavor respectively to the casing apparatus.

The drawing illustrates schematically apparatus for preparing carbonated beverages according to the process of this invention.

When the flavor is fed to the empty bottles 10 on a conveyor 11 on their way to the filler 12, independent feed means or conduits 13 are provided with conventional automatic valves 14 suitably controlled by well-known electric trip mechanism 15 for supplying a measured amount of flavor in timed relation and seequence to each bottle. Any number of such flavor sources 13a, 13b, 13c, 13d, 13e, etc. may be provided and operated to deliver the same flavor to one bottle on the conveyor or a continuous series, e.g., six and different flavors to the next six, and so on.

Thus, the bottles preliminarily provided with flavor will be filled by the filler 12 with the bland or neutral liquid beverage mixture, suitably agitated and carried to the capper 16. Or, as stated, the same feed means or conduits may be placed in a position and operated similarly to feed the flavor to the bottles as they leave the filler after being filled with the basic mixture, as shown at 17, and suitably agitated.

As will be seen, there is never any occasion to clean out any of the equipment when changing from one flavor to another, and there is no danger of mixing flavors or producing off-flavors. The ability, moreover, of being able to fill any number of continuously supplied bottles with a particular flavor and then another group with a different flavor, and do it continuously, is of great advantage in an industry where economies must be practiced to provide the products at a popular price and have them of high quality so jealously maintained by the beverage industry.

While I have referred herein to bottles, this is purely illustrative since all kinds of containers may be used, e.g., of plastic, metal such as cans, etc. These are closed by conventional means, and the term "capper" is intended to cover the closing or sealing of the filled containers, however this is accomplished.

It will be appreciated that some containers may be supplied with flavor before filling and others may be supplied after filling, as found most convenient by a particular plant. Thus, six flavor conduits may be arranged in advance of the filler, and six thereafter, and they may supply twelve different flavors, or any number of the same flavor.

From the foregoing it will be observed that the advantages of the present invention, in comparison with the old methods, are:

(1) By mixing sugar syrup only and water together, it is possible to filter this solution before entering the water cooler and to sterilize the mixture in the water cooler or in the carbonator or in the filler itself by application of ultraviolet radiation lamps.

(2) *Economy.*—This method can be applied in those bottling plants which use several flavors per day.

As explained, the disadvantages of the old methods are that it is necessary to clean the filler, and the whole system, to get rid of the old flavor before introducing the new. In the present method it is necessary only to clean syrupers and to drain syrup solution from the system.

(3) The speed of this system will be relatively higher than conventional operations because of the absence of foaming problems.

(4) By mixing syrup and water before cooling there will be less air content as compared with prior practice.

As one example, water at room temperature is mixed with sugar syrup of the desired Brix and the solution is then filtered and introduced to the conventional cooler where it is sterilized by the application of ultraviolet radiation lamps. Thereafter, the cooled, sterilized beverage base, containing water and sugar syrup, is carbonated in the usual manner, and the carbonated base product is introduced to the filler. The bottles or other containers which have been previously supplied with flavor are then filled in the customary way and capped, or the bottles are filled with the basic beverage composition in the filler and thereafter supplied with the flavor. This method, as explained above, prevents objectionable foaming, and the only equipment which has to be cleaned is the syruper, which is normally accomplished, in any event, and there is no need to clean the filler in order to switch from one flavor to another, as is now required, and certain other equipment also frequently must be cleaned when doing this in order to prevent affecting the particular flavor desired, i.e., to prevent the impartation of off-flavors.

It is possible, also, with this invention to supply a particular flavor in increments. That is, part of a particular flavor can be supplied in advance of the filler, and the remainder can be supplied to the container after it has passed from the filler on its way to the capper.

The mixing of the flavor with the beverage base, i.e., the water-sugar syrup mixture, is accomplished in the usual manner by conventional equipment so that the flavor is thoroughly and uniformly distributed throughout the contents of the container.

While I have referred herein to the introduction of the flavor separately from the basic beverage mixture of carbonated water and sweetening, it is to be understood that in addition to the flavor, a suitable color such as the usual vegetable color may be introduced separately and in the same manner as the flavor, namely, to the bottles before filling or after filling, or both. Generally, the flavor and color are added at the same time, and in referring to flavor in the appended claims, I mean to include the flavor per se as well as the flavor and the color as separate ingredients or combined in the usual flavor concentrate, and which is free of sweetening in each instance.

With respect to the Brix this, like flavor and color, will vary with different beverage manufacturers, and it will be appreciated that the character of the basic beverage mixture of carbonated water and sweetening is not, of itself, a feature of this invention, as it must necessarily be controlled by the individual beverage plant.

While I have indicated above that in some cases it is desirable to clean out the syruper, this is not essential and, in fact, by following the present invention the need for cleaning out any of the equipment is avoided when switching from one flavor to another. Obviously, all of the equipment will be kept clean and sanitary in accordance with the usual practice and legal requirements.

I claim:

1. A method of filling contaners with a carbonated beverage comprising the steps of: mixing water and a sugared syrup together and obtaining a transparent colorless sweetened water mixture; subjecting the sweetened water mixture to a carbon dioxide gas and obtaining a carbonated sweetened water mixture; supplying an unsweetened flavor concentrate to the containers; independently supplying the carbonated sweetened water mixture to the containers; and then closing the containers.

2. A method of filling containers with a carbonated beverage comprising the steps of: mixing water and a sugared syrup together and obtaining a transparent colorless sweetened water mixture; subjecting the sweetened water mixture to a carbon dioxide gas and obtaining a carbonated sweetened water mixture; sterilizing the carbonated sweetened water mixture; supplying an unsweetened flavor concentrate to the containers; independently supplying the carbonated sweetened water mixture to the containers; and then closing the containers.

3. A method of filling containers with a selected carbonated beverage comprising; mixing water and a sugared syrup together and obtaining a transparent colorless sweetened water mixture; subjecting the sweetened water mixture to a carbon dioxide gas and obtaining a carbonated sweetened water mixture; utilizing a plurality of unsweetened flavor concentrates; selectively supplying one of the flavor concentrates to the containers; independently supplying the carbonated sweetened water mixture to the containers; and then closing the containers.

References Cited in the file of this patent

UNITED STATES PATENTS

| | | |
|---|---|---|
| 1,270,798 | Dunkley | July 2, 1918 |
| 1,365,773 | Dickerson | Jan. 18, 1921 |
| 1,750,467 | Hansen | Mar. 11, 1930 |
| 1,934,810 | Mazzola | Nov. 14, 1933 |
| 2,043,739 | Erickson et al. | June 9, 1936 |
| 2,411,896 | Richmond et al. | Dec. 3, 1946 |
| 2,549,781 | Emmons et al. | Apr. 24, 1951 |
| 2,618,564 | Mills et al. | Nov. 18, 1952 |
| 2,662,017 | Winters | Dec. 8, 1953 |